US012694791B2

(12) United States Patent
Morgan et al.

(10) Patent No.: US 12,694,791 B2
(45) Date of Patent: *Jul. 28, 2026

(54) COMPUTER PROGRAM AND METHOD FOR PROVIDING REAL-TIME ANALYSIS AND STRATEGY THROUGH AN AUTOMATED AIR BATTLE MANAGER

(71) Applicant: Raft LLC, Reston, VA (US)

(72) Inventors: Steven Morgan, Whitesboro, NY (US);
Bhaarat Sharma, Vienna, VA (US);
Alec Karkonta, Spring Hill, FL (US);
Trey Coleman, Niceville, FL (US);
Shubhi Mishra, Vienna, VA (US)

(73) Assignee: RAFT LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/360,330

(22) Filed: Oct. 16, 2025

(65) Prior Publication Data

US 2026/0045166 A1 Feb. 12, 2026

Related U.S. Application Data

(63) Continuation of application No. 19/016,595, filed on Jan. 10, 2025, now Pat. No. 12,505,748.

(Continued)

(51) Int. Cl.
| | |
|---|---|
| *G10L 15/26* | (2006.01) |
| *G08G 5/00* | (2006.01) |
| G10L 13/02 | (2013.01) |

(52) U.S. Cl.
CPC ............... *G08G 5/00* (2013.01); *G10L 13/02* (2013.01); *G10L 15/26* (2013.01)

(58) Field of Classification Search
None
See application file for complete search history.

(56) References Cited

U.S. PATENT DOCUMENTS

| | | |
|---|---|---|
| 5,933,099 A | 8/1999 | Mahon |
| 8,370,146 B1 | 2/2013 | Schalkwyk et al. |
| | (Continued) | |

OTHER PUBLICATIONS

Non-Final Office Action issued in related U.S. Appl. No. 19/016,595 on Jun. 13, 2025.

(Continued)

*Primary Examiner* — Neeraj Sharma
(74) *Attorney, Agent, or Firm* — Mark H. Whittenberger; Holland & Knight LLP

(57) ABSTRACT

Embodiments are directed towards a computer-implemented method for communicating real-time aerial combat analysis and strategy. The method may include creating one or more communication channels for one or more affiliated pilots engaged in aerial combat to submit queries to an automated air battle manager (ABM), and for the one or more affiliated pilots to receive feedback from the automated ABM. The method may also include receiving data related to one or more enemy aircraft in sensory range of one or more friendly aircraft occupied by the one or more affiliated pilots, cross-referencing one or more captured images from the received data with one or more of global positioning system (GPS) coordinates and known flight formations, and detecting flight groups or determining geographic relationships between the one or more enemy aircraft based on the one or more cross-referenced images. The method may also include receiving one or more queries from the one or more affiliated pilots, and generating responses for the one or more queries based on real-time combat data.

16 Claims, 7 Drawing Sheets

200

Related U.S. Application Data

(60) Provisional application No. 63/618,966, filed on Jan. 9, 2024.

(56) References Cited

U.S. PATENT DOCUMENTS

| | | | | |
|---|---|---|---|---|
| 8,751,242 | B2 | 6/2014 | Arasada | |
| 8,793,139 | B1 | 7/2014 | Serban et al. | |
| 9,371,140 | B1 * | 6/2016 | Johnson | G08G 5/21 |
| 9,567,078 | B2 * | 2/2017 | Zang | B64U 10/13 |
| 9,953,540 | B2 * | 4/2018 | Macfarlane | G01C 21/20 |
| 10,470,241 | B2 * | 11/2019 | Shaw | H04W 84/18 |
| 11,348,582 | B2 | 5/2022 | Lindahl | |
| 11,496,582 | B2 * | 11/2022 | Rastrow | H04M 3/42382 |
| 11,578,481 | B1 | 2/2023 | Kohut | |
| 12,148,310 | B1 * | 11/2024 | Manouchehri | G08G 5/25 |
| 2008/0143558 | A1 | 6/2008 | Ben-Ari | |
| 2010/0240988 | A1 * | 9/2010 | Varga | G06F 3/011 |
| | | | | 600/425 |
| 2015/0228196 | A1 * | 8/2015 | Sampigethaya | B64D 43/00 |
| | | | | 701/120 |
| 2018/0095714 | A1 | 4/2018 | Taylor et al. | |
| 2019/0251350 | A1 | 8/2019 | Shukla et al. | |
| 2019/0301837 | A1 | 10/2019 | Gold | |
| 2019/0317718 | A1 * | 10/2019 | George | G06F 3/167 |
| 2021/0173480 | A1 | 6/2021 | Osterhout et al. | |
| 2023/0145183 | A1 | 5/2023 | Miriam | |
| 2024/0249628 | A1 | 7/2024 | Dicosola | |
| 2025/0083834 | A1 * | 3/2025 | Romani de Oliveira | |
| | | | | B64D 45/00 |

OTHER PUBLICATIONS

Notice of Allowance issued in related U.S. Appl. No. 19/016,595 on Nov. 18, 2025.

* cited by examiner

700

COMPUTER PROGRAM AND METHOD FOR PROVIDING REAL-TIME ANALYSIS AND STRATEGY THROUGH AN AUTOMATED AIR BATTLE MANAGER

RELATED APPLICATIONS

This is a continuation of U.S. patent application Ser. No. 19/016,595, filed Jan. 10, 2025, which claims benefit to U.S. Provisional Application No. 63/618,966, filed Jan. 9, 2024, the entire contents of which may be incorporated herein by reference.

BACKGROUND

An air battle manager (ABM) is a US Air Force officer who manages command and control capabilities for ground and airborne units. ABMs are trained to operate computerized radar sensors, electronic countermeasure equipment, and communication nets with other units. They also command mission crews to perform combat, training, and other missions

SUMMARY

In one or more embodiments of the present disclosure, a computer-implemented method for communicating real-time aerial combat analysis and strategy is provided. The method may include creating one or more communication channels for one or more affiliated pilots engaged in aerial combat to submit queries to an automated air battle manager (ABM), and for the one or more affiliated pilots to receive feedback from the automated ABM. The method may also include receiving data related to one or more enemy aircraft in sensory range of one or more friendly aircraft occupied by the one or more affiliated pilots, cross-referencing one or more captured images from the received data with one or more of global positioning system (GPS) coordinates and known flight formations, and detecting flight groups or determining geographic relationships between the one or more enemy aircraft based on the one or more cross-referenced images. The method may further include receiving one or more queries from the one or more affiliated pilots, and generating responses for the one or more queries based on real-time combat data.

One or more of the following features may be included. A first module may be configured to provide the one or more communication channels for submitting queries, receiving responses, and obtaining updates for situational awareness. All queries, responses, and updates may be transmitted orally over an audio channel. The first module may include a speech-to-text (STT) service configured to capture spoken commands from any of the one or more affiliated pilots and to convert the spoken commands into text-based inputs for the automated ABM, the first module may also include a text-to-speech (TTS) service configured to read aloud responses generated by the automated ABM for any of the one or more affiliated pilots. The first module may be configured to run an output of the TTS service through the STT service to recreate the initial text as a part of an error-checking protocol. The first module may employ a context-free grammar (CFG) system to define a set of unique commands. The first module may be configured to increase the delivery speed of the orally transmitted responses, or updates generated by the automated ABM based on the phase of the engagement, such that in the early phase of the engagement commands are calmly stated and use complete sentences and in later phases, commands are succinctly stated and use abbreviations and contractions within the CFG system. A second module may be configured to cross-reference the captured images with GPS coordinates and known flight formations, and to detect flight groups and to determine geographic relationships between one or more enemy aircraft. The second module may be further configured to: detect groups of aircraft, where each group consists of aircraft positioned within a predefined number of nautical miles of one another, and test each group of aircraft for specific formation criteria. A third module may be configured to derive responses and to issue commands based on real-time combat data.

In yet another embodiment of the present disclosure, a computer program product resides on a non-transitory computer-readable medium. The computer program product may include a plurality of instructions stored thereon. When executed by a processor, the instructions may cause the processor to perform operations including creating one or more communication channels for one or more affiliated pilots engaged in aerial combat to submit queries to an automated air battle manager (ABM), and for the one or more affiliated pilots to receive feedback from the automated ABM. The instructions may also include receiving data related to one or more enemy aircraft in sensory range of one or more friendly aircraft occupied by the one or more affiliated pilots, cross-referencing one or more captured images from the received data with one or more of global positioning system (GPS) coordinates and known flight formations, and detecting flight groups or determining geographic relationships between the one or more enemy aircraft based on the one or more cross-referenced images. The instructions may further include receiving one or more queries from the one or more affiliated pilots, and generating responses for the one or more queries based on real-time combat data.

One or more of the following features may be included. A first module may be configured to provide the one or more communication channels for submitting queries, receiving responses, and obtaining updates for situational awareness. All queries, responses, and updates may be transmitted orally over an audio channel. The first module may include a speech-to-text (STT) service configured to capture spoken commands from any of the one or more affiliated pilots and to convert the spoken commands into text-based inputs for the automated ABM, the first module may also include a text-to-speech (TTS) service configured to read aloud responses generated by the automated ABM for any of the one or more affiliated pilots. The first module may be configured to run an output of the TTS service through the STT service to recreate the initial text as a part of an error-checking protocol. The first module may employ a context-free grammar (CFG) system to define a set of unique commands. The first module may be configured to increase the delivery speed of the orally transmitted responses, or updates generated by the automated ABM based on the phase of the engagement, such that in the early phase of the engagement commands are calmly stated and use complete sentences and in later phases, commands are succinctly stated and use abbreviations and contractions within the CFG system. A second module may be configured to cross-reference the captured images with GPS coordinates and known flight formations, and to detect flight groups and to determine geographic relationships between one or more enemy aircraft. The second module may be further configured to: detect groups of aircraft, where each group consists of aircraft positioned within a predefined number of nautical miles of one another, and test each group of aircraft for specific formation criteria. A third module may be configured to derive responses and to issue commands based on real-time combat data.

Additional features and advantages of embodiments of the present disclosure will be set forth in the description that follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
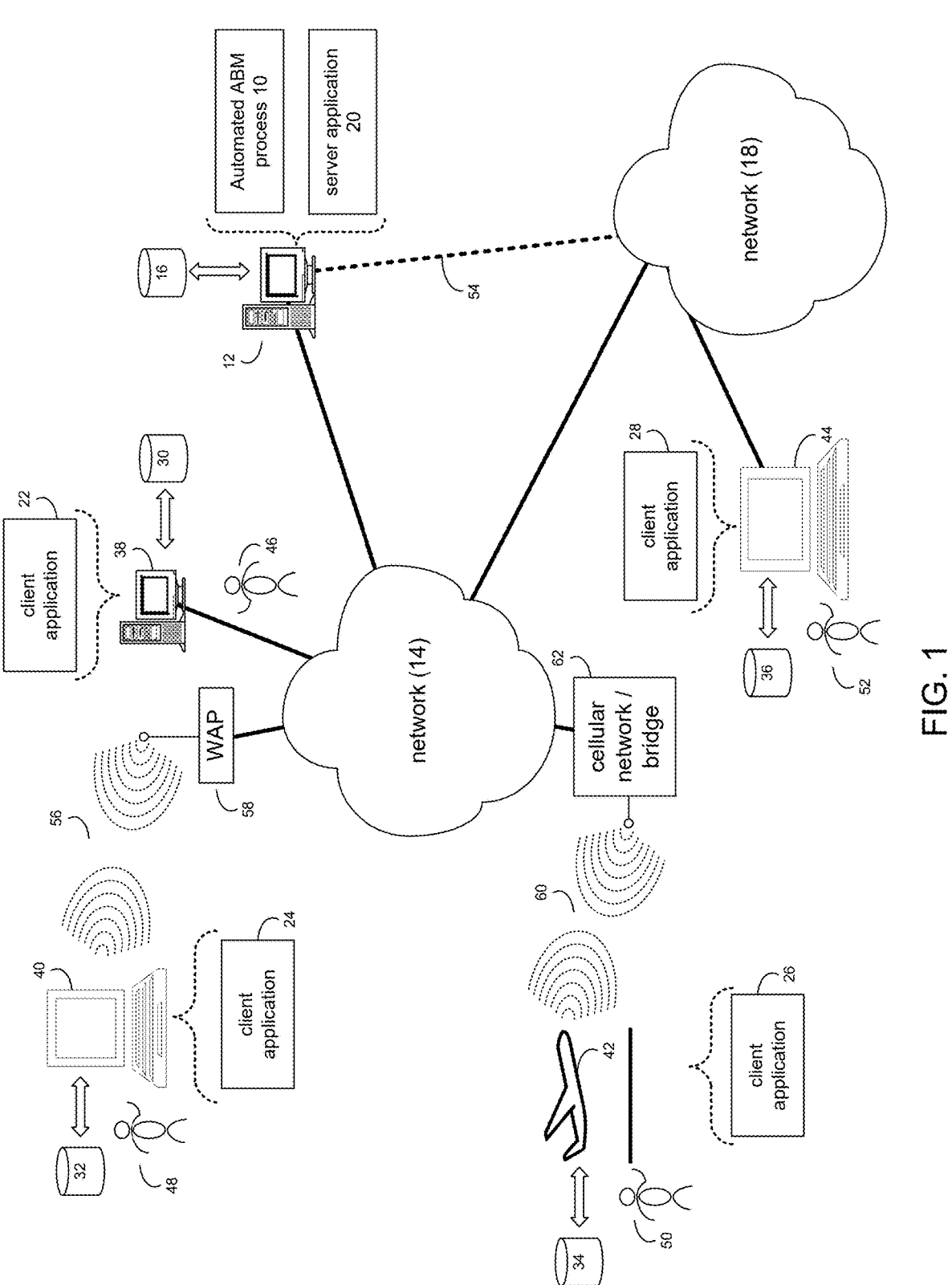
FIG. 1 diagrammatically depicts an automated air battle manager (ABM) process coupled to a distributed computing network.

The systems and methods disclosed herein may either replace human battle managers or it may augment human battle managers. More specifically, the system described herein may provide battle management services faster and more accurately than humans, and it may be used in areas where humans do not have access. After further development, this system may be fully personalized to fighter pilots, so that each fighter pilot may have their own personal battle manager that is attuned to the pilot's individual preferences.

The systems and methods discussed herein have wide applications in air-gapped environments, i.e. environments that do not have internet connectivity or the ability to use cloud resources. Such applications may include providing warfighters with the ability to control common operating pictures (COPs) through voice commands only. By auto-tuning and inline validation, the results generated may produce highly accurate, audibly human-sounding spoken responses. The ability to train a voice model on limited data running on a small hardware footprint may create custom virtual assistants which in turn may be used for any application in an edge environment, i.e. in locations or devices operate outside centralized data centers, often in isolated, decentralized, or remote areas where real-time decision-making may be critical, and connectivity to a cloud infrastructure may be limited or unavailable. The current state of the art in training and using human-sounding voice models may require hyper-scale infrastructure, where hyper-scale infrastructure may refer to a computing environment designed to handle extremely large-scale operations, including massive amounts of data, high computational demands, and rapid scaling. It typically involves large, distributed systems and advanced architectures optimized for intensive workloads The approach to identifying formations on a map disclosed herein may be applicable in research of animal movements and other military applications aside from air battle management. research of bird flight patterns to determine environmental impact may be performed using non-deterministic methods which are prone to error. The approach described herein may allow for greater accuracy in identifying the behavior of groups of animals. Understanding the formations of any battle is key to developing the responding tactics that may be employed. Whether at land, sea, air, space, or a combination of all domains, the approach described herein may identify formations that may be used to inform an appropriate responding strategy.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

Referring to FIG. 1, there is shown an automated aerial battle manager (ABM) process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally, and/or alternatively, automated ABM process 10 may reside on a client electronic device, such as a personal computer, notebook computer, personal digital assistant, or the like.

The instruction sets and subroutines of the automated ABM process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM). Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Microsoft Exchange™ Server, etc. Server application 20 may interact with one or more client applications (e.g., client applications 22, 24, 26, 28) in order to execute automated ABM process 10. Examples of client applications 22, 24, 26, 28 may include, but are not limited to, EDAs or design verification tools such as those available from the assignee of the present disclosure. These applications may also be executed by server computer 12. In some embodiments, automated ABM process 10 may be a stand-alone application that interfaces with server application 20 or may be applets/applications that may be executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition, or as an alternative to being server-based applications residing on server computer 12, Automated ABM process 10 may be a client-side application residing on one or more client electronic devices 38, 40, 42, 44 (e.g., stored on storage devices 30, 32, 34, 36, respectively). As such, automated ABM process 10 may be a stand-alone application that interfaces with a client application (e.g., client applications 22, 24, 26, 28), or may be applets/applications that may be executed within a client application. As such, automated ABM process 10 may be a client-side process, server-side process, or hybrid client-side/server-side process, which may be executed, in whole or in part, by server computer 12, or one or more of client electronic devices 38, 40, 42, 44. More specifically, electronic device 42 may be some kind of transponder device that may be permanently or removably connected to an aircraft in use by user 50.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize the EDA to create an electronic design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18.

Further, server computer 12 (e.g., the computer that executes server application 20) may be connected to network 14 through secondary network 18, as illustrated with phantom link line 54.

In some embodiments, automated ABM process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™ Redhat Linux™, Apple IOS, ANDROID, or a custom operating system.

Figure 2:
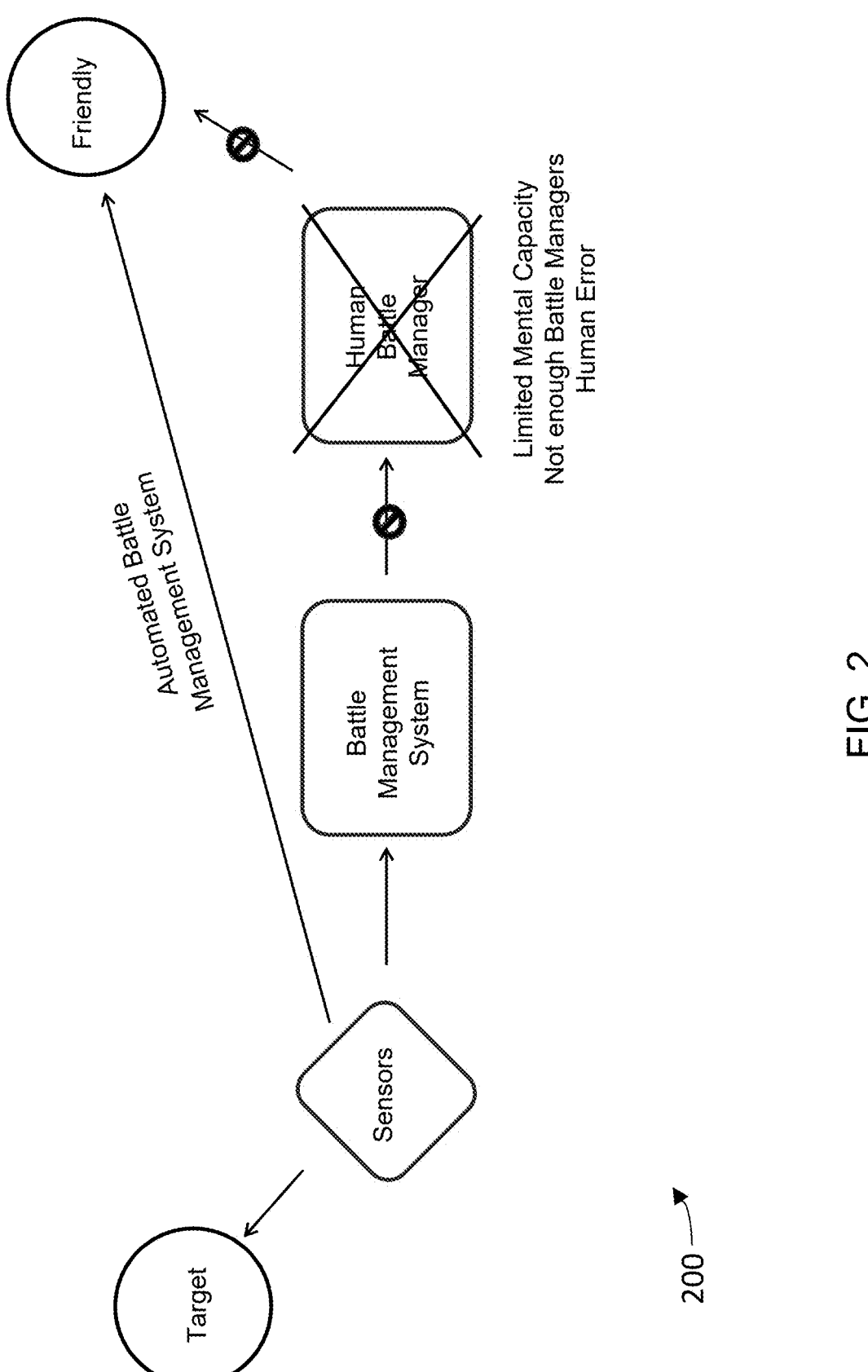
FIG. 2 shows a diagrammatic representation of how an automated ABM system may replace human battle managers to provide real-time aerial combat analysis and strategy, in accordance with embodiments of the present disclosure.

Referring now to FIG. 2, flow chart 200 showing how an automated ABM system may replace human battle managers to provide real-time aerial combat analysis and strategy, is provided. Today, fighter pilots and air battle managers may rely on human simulator operators to mimic other fighter pilots or battle managers. However, with automated ABM process 10, humans may no longer be required during training. Instead, automated ABM process 10 may provide realistic voice interaction at the time they want for a fraction of the cost. In some embodiments, ABM process 10 may not require housing on the friendly aircraft occupied by affiliated pilots. Instead, ABM process 10 may only require access to radar and voice feeds to be able to speak on a radio feed, and connectivity to this data may be available through some form of tactical data link.

Figure 3:
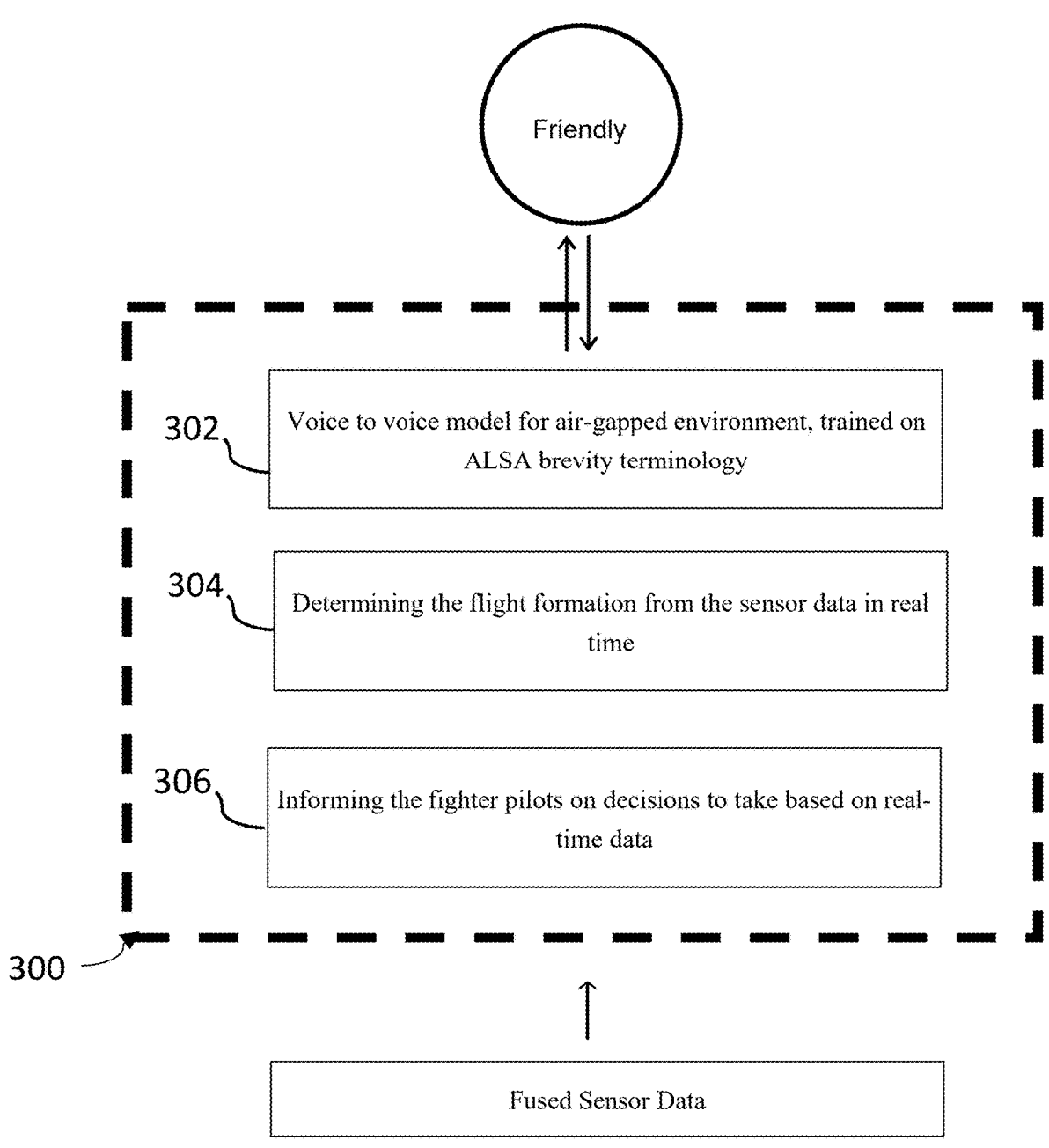
FIG. 3 shows a diagrammatic representation of how an ABM interacts with friendly aircraft to provide real-time aerial combat analysis and strategy, in accordance with embodiments of the present disclosure.

Referring now to FIG. 3, a diagrammatic representation of how an automated aerial battle manager (ABM) 300 may interact with friendly aircraft to provide real-time aerial combat analysis and strategy is provided. Automated ABM 300 may consist of three modules. Voice-to-voice module 302 may provide an interface for end-users to provide queries, get responses, and receive updates for situational awareness. In some embodiments, audio input may be provided by conventional communication devices present on the friendly aircraft, for example pilot radio devices. ABM process 10 may connect to a radio feed via networked servers that already communicate with the communication devices present on the friendly aircraft. Voice-to-voice module 302 may be dependent upon the other two modules, namely determining formations module 304 and deriving responses module 306. Determination of flight formation may inform all queries and updates, because many queries may be based upon formation-dependent flight group labels, making the accuracy of determining the formation critical to all follow-on responses. Voice-to-voice module 302 may be specifically trained to filter for specific brevity keywords and to respond to fighter pilot queries or observed events using accurate and timely responses that reflect human judgment in their response through manipulation of the voice and modifying phrasing to get critical information to the friendly.

In some embodiments voice-to-voice module 302 may recognize queries with over a 95% accuracy rate and may provide an accurate spoken response within 3 seconds. Providing a distinct advantage over what a human air battle manager (ABM) may provide. A human ABM may receive queries from multiple pilots simultaneously and may be required to provide an accurate response. An automated ABM may maintain battle awareness without suffering from the mental taxation of context switching delaying responses.

Figure 4:
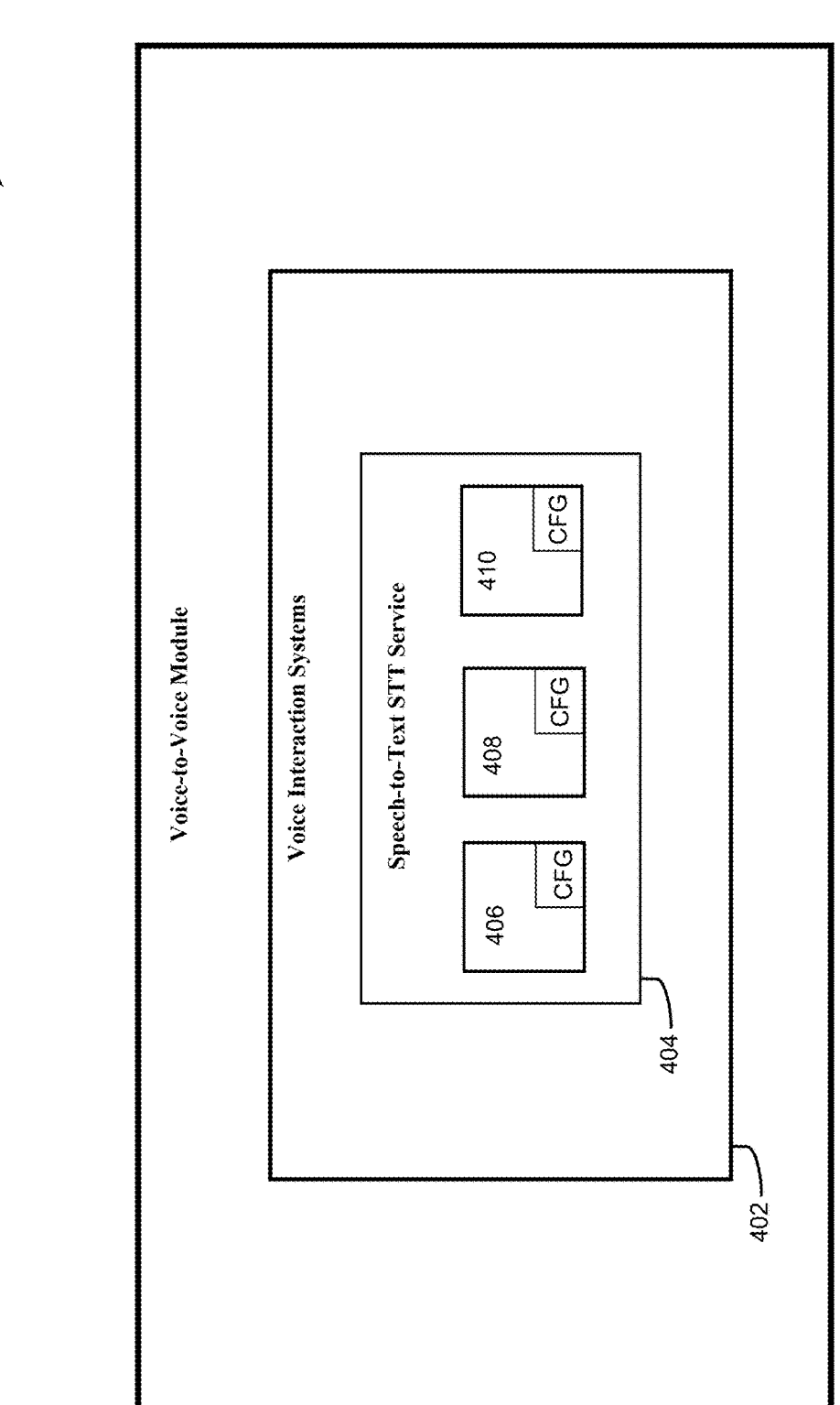
FIG. 4 shows a diagrammatic representation of a voice-to-voice module, in accordance with embodiments from FIG. 3 of the present disclosure.

Referring now to FIG. 4, a diagrammatic representation of voice-to-voice module 400 according to FIG. 3 is provided. Voice-to-voice module 400 may include real-time voice interaction systems 402 that may be fast, accurate, and robust in order to deal with the complexity of spoken language. The input (entry point) to voice interaction systems 402 may be Speech-to-Text (STT) service 404 that may capture spoken commands from an end-user. STT service 404 may employ multiple open-source STT models 406, 406, 410 running in parallel, each configured to capture commands from the end-user. The parallel STT models 406, 406, 410 may introduce redundancy that allows for a much higher hit rate on registering spoken commands. Further, each STT model may employ a customized context-free grammar (CFG) that defines a unique command set. The CFG may allow for matching between transcribed user input and actual spoken commands. This combination of redundancy and matching may allow voice-to-voice module 400 not to miss important commands in high-risk, fast-paced situations where asking the end-user to repeat a command may not be a viable option. The output of voice-to-voice module 400 may be a clear and intelligible text-to-speech (TTS) when the ABM-generated response is transmitted to the end-user.

In some embodiments, the content of the ABM-generated response to the end-user may contain specific words not in the traditional English vernacular. Open-source models may not be trained on the jargon terminology needed to accurately describe objects/actions in an aerial combat scenario, and as a result, may have difficulty recognizing terms or pronouncing specific terms. To improve performance a custom training dataset using a unique vocabulary may be employed. Several hours of transcripts describing each formation may be generated. Then each transcript may be read and recorded by a professional voice actor. The recorded voice data may then be used to fine-tune an existing TTS model to adjust the pacing, pronunciation, and emotional emphasis. Before providing the final output to the end-user, voice-to-voice module 400 may run a series of checks on the generated audio. In some embodiments, audio traffic may be ingested as a waveform (WAV) array and may then be converted to text. The audio data may be converted to text and arranged in order. Then a text message including the converted text may be sent via TCP protocols to a logic core included in voice-to-voice module 400. The logic core may generate a response that may be run through a TTS model to produce a WAV array, which in turn may be interpreted as spoken audio on a radio channel.

Voice-to-voice module 400 may increase the intensity or output speed of the orally transmitted responses, or updates generated by the ABM over the course of the engagement. For example, in the early phase of the engagement commands may be calmly stated and use complete sentences whereas in later phases of the engagement, commands may be succinctly stated and use abbreviations and contractions within the CFG system. Small TTS models 406, 406, 410 may run locally in real-time and may often produce artifacts, miss words, or fail in other unexpected ways, where artifacts may be distortions or anomalies that deviate from what would be expected in natural, human-like speech.

In some embodiments, to mitigate these issues several stages of output validation on the TTS model may be employed. First, the TTS output may be run through one of STT models 406, 406, 410 to see if the initial text may be recreated. Next a custom model that may identify artifacts in generated audio may be applied, and if either of these stages finds an issue then the audio may be regenerated. Finally, several auto-tuning transformations may be applied to the audio to guarantee clarity in our output.

Referring again to FIG. 3, determining formations module 304 may detect flight formations by dynamically monitoring flight groups, where a flight group may be defined by counting the number of aircraft within 3 nautical miles of another aircraft, then applying logic to determine the geographic relationship between aircraft. Traditionally, a human ABM has been used to perform this task in real-time and give estimates. However, an automated ABM may calculate distances and formations with sub-second latency with complete accuracy.

In some embodiments, ABM process 10 may parse through all purpose structured eurocontrol surveillance information exchange (ASTERIX) format data and joint range extension application protocol-C (JREAP-C) for live feeds. ASTERIX may be a standardized format for exchanging surveillance data in air traffic management (ATM) systems, widely used in Europe and other regions to ensure interoperability between various radar systems, sensors, and control centers. JREAP-C may be a standardized protocol used to extend the range of tactical data exchange by utilizing Internet Protocol (IP) networks. ABM process 10 may also employ a distributed interactive simulation (DIS) developed by the Institute of Electrical and Electronics Engineers (IEEE) standard data for simulations, for example DIS IEEE 1278.2-2015 that may be used to govern real-time, distributed simulations for military training, testing, and mission rehearsal.

Figure 5:
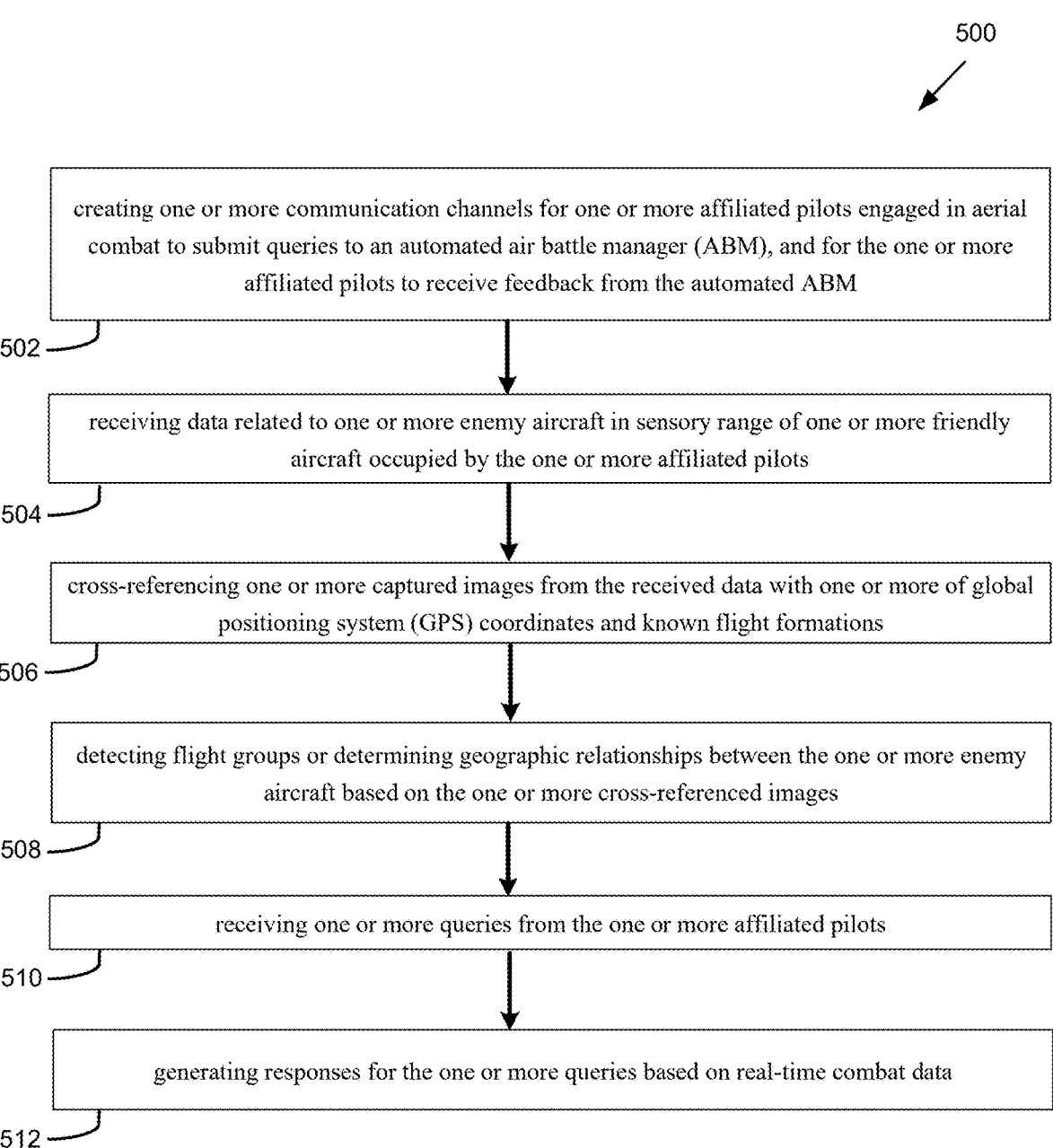
FIG. 5 is an example flowchart of the ABM process of FIG. 1 in accordance with embodiments of the present disclosure.

Referring now to FIG. 5, flowchart 500 describing ABM process 10 is provided. ABM process 10 may create (502) one or more communication channels for one or more affiliated pilots engaged in aerial combat to submit queries to an automated air battle manager (ABM), and for the one or more affiliated pilots to receive feedback (for example generated responses or situational updates) from the automated ABM. ABM process 10 may also receive (504) data related to (for example captured images of) one or more enemy aircraft in sensory range of one or more friendly aircraft occupied by the one or more affiliated pilots, cross-reference (506) one or more captured images from the received data with one or more of global positioning system (GPS) coordinates and known flight formations, and detect (508) flight groups or determining geographic relationships between the one or more enemy aircraft based on the one or more cross-referenced images, GPS coordinates, and known flight formations. ABM process 10 may further receive (510) one or more queries from the one or more affiliated pilots, and generate (512) responses for the one or more queries based on real-time combat data.

Figure 6:
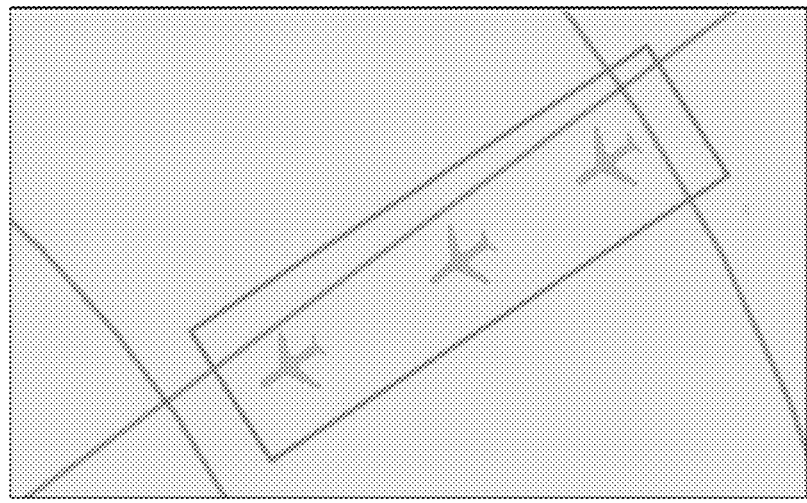
FIG. 6 shows a diagrammatic representation of a ladder formation, in accordance with embodiments of the present disclosure.
Figure 6:
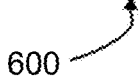
Figure 7:
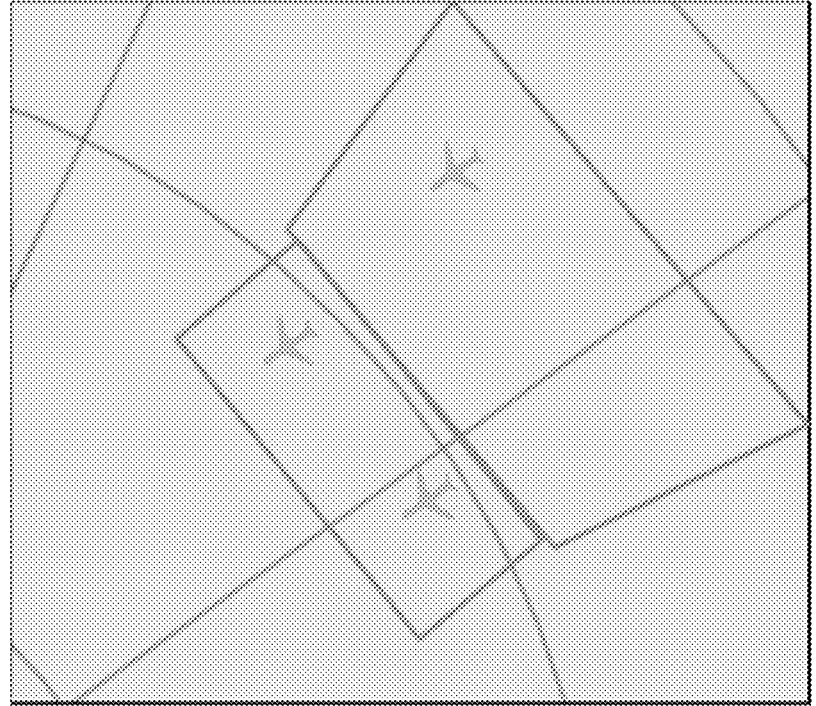
FIG. 7 shows a diagrammatic representation of a champagne formation, in accordance with embodiments of the present disclosure.

Referring now to FIGS. 6 & 7, example formation 600 and example formation 700, are provided. The detection of a formation and providing the information back to friendly pilots may be accomplished through a picture call. The picture call may set the stage for the fighter pilots to determine which tactics may be used during the engagement. More specifically, picture calls may first identify groups, which may include any aircraft within 3 nautical miles of one another. Once the groups have been determined, a series of tests may be performed to identify the relationships between them. Calculation of formations may be performed using conventional hardware, and may not be overly computer-intensive for an instance focused on a single lane within the region of battle.

In some embodiments, each formation may be tested to see if it meets the criteria for a specific formation. The criteria may be a combination of what is defined by an air land space application (ALSA), and through the knowledge of pilots and air battle managers. By using the picture call as a background, a series of shapes may be drawn using GPS coordinates to deterministically test formations. The first test shown by example formation 600 may be an example of testing for a ladder formation, which may be an arrangement where aircraft are staggered in altitude and/or lateral position, creating a "stepped" or "ladder-like" appearance when viewed from the side or above. This formation is often used to maintain clear separation between aircraft while maximizing visibility and operational effectiveness. The second test shown by example formation 700 may be an example of testing for champagne formation, which may be a specific arrangement of aircraft resembling the shape of a champagne glass when viewed from above. This formation may be commonly used in military aviation, particularly for tactical purposes, and it emphasizes maintaining flexibility and coverage while ensuring mutual support between aircraft. For the purposes of determining formations module 304, if all aircraft may be contained within the drawn shapes of example formations 600, 700, the formation may be considered to have been found.

In some embodiments, continuous monitoring of sensor feeds may improve the awareness of friendly pilots to the point where no event that may be remotely monitored is overlooked. Further, determining formations module 304 may be scaled to manage the necessary volume of data to respond to events within less than a second of an event taking place. Pop-up groups, maneuvers, threats, group joining, or splitting may all be continuously monitored and relayed by voice to the friendly pilot. Given an airspace with dozens of hostile aircraft, an automated ABM system that consistently monitors and prioritizes communications may consistently outperform a human.

In some embodiments, the constant and consistent monitoring of the state of battle may allow for an automated ABM to accurately respond to all queries from a friendly aircraft. Information may be pulled and prepared in a generalized manner to be easily formatted to an appropriate response. The automated ABM may be better able to understand how to respond to specific queries given by a friendly pilot using continuously updated information. Developing responses to queries in the deriving responses module 306 may be accomplished through a combination of rules and machine learning models.

In some embodiments, responses to pilot queries may be graded on accuracy, format and timeliness. For ABM process 10, providing consistently formatted responses may be very straightforward. Timeliness may require judgement learned through experience for humans. Generation of the content of responses to fighter pilots from ABM process 10 may be accomplished through a rules based expert system. Judgement may be trained through a reinforcement learning (RL) model. RL models may be a type of machine learning model used to train artificial intelligences (AIs) to make a sequence of decisions by interacting with an environment to maximize a long-term reward. Such training may allow a machine or AI to understand that timeliness may be more than just quickly responding to queries or generating commands and may allow the machine to distinguish between critical information to be urgently communicated to an affiliated pilot and non-critical information that may be held and passed on at a later time without issue. This model may understands verbal cadence and intensity. When a friendly aircraft may be in close proximity to an enemy aircraft, responses/commands may be provided faster and more intensely. Conversely, when a friendly aircraft may be a long distance from an enemy aircraft, responses may be provided at a calm and steady rate. Existing text-to-speech models may allow for voice parameters to be manipulated, but understanding how to manipulate those parameters may be context specific and may require specialized training.

It will be apparent to those skilled in the art that various modifications and variations may be made to Automated ABM process 10 and/or embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for communicating real-time aerial combat analysis and strategy, the method comprising:

creating one or more communication channels for one or more affiliated pilots engaged in aerial combat to submit queries to an automated air battle manager (ABM), and for the one or more affiliated pilots to receive feedback from the automated ABM;

receiving data related to one or more enemy aircraft in sensory range of one or more friendly aircraft occupied by the one or more affiliated pilots;

cross-referencing one or more captured images from the received data with one or more of global positioning system (GPS) coordinates and known flight formations;

detecting flight groups or determining geographic relationships between the one or more enemy aircraft based on the one or more cross-referenced images;

receiving one or more queries from the one or more affiliated pilots; and generating responses for the one or more queries based on real-time combat data, wherein a second module is configured to cross-reference the captured images with GPS coordinates and known flight formations, and to detect flight groups and to determine geographic relationships between one or more enemy aircraft, wherein the second module is further configured to:

detect groups of aircraft, wherein each group consists of aircraft positioned within a predefined number of nautical miles of one another; and test each group of aircraft for specific formation criteria.

2. The computer-implemented method of claim 1, wherein a first module is configured to provide the one or more communication channels for submitting queries, receiving responses, and obtaining updates for situational awareness.

3. The computer-implemented method of claim 2, wherein all queries, responses, and updates are transmitted orally over an audio channel.

4. The computer-implemented method of claim 2, wherein the first module includes a speech-to-text (STT) service configured to capture spoken commands from any of the one or more affiliated pilots and to convert the spoken commands into text-based inputs for the automated ABM, the first module also includes a text-to-speech (TTS) service configured to read aloud responses generated by the automated ABM for any of the one or more affiliated pilots.

5. The computer-implemented method of claim 4, wherein the first module is configured to run an output of the TTS service through the STT service to recreate the initial text as a part of an error-checking protocol.

6. The computer-implemented method of claim 2, wherein the first module employs a context-free grammar (CFG) system to define a set of unique commands.

7. The computer-implemented method of claim 6, wherein the first module is configured to increase the delivery speed of the orally transmitted responses, or updates generated by the automated ABM based on the phase of the engagement, such that in the early phase of the engagement commands are calmly stated and use complete sentences and in later phases, commands are succinctly stated and use abbreviations and contractions within the CFG system.

8. The computer-implemented method of claim 1, wherein a third module is configured to derive responses and to issue commands based on real-time combat data.

9. A computer program product residing on a non-transitory computer-readable medium having a plurality of instructions stored thereon which, when executed by a processor, cause the processor to perform operations comprising:

creating one or more communication channels for one or more affiliated pilots engaged in aerial combat to submit queries to an automated air battle manager (ABM), and for the one or more affiliated pilots to receive feedback from the automated ABM;

receiving data related to one or more enemy aircraft in sensory range of one or more friendly aircraft occupied by the one or more affiliated pilots;

cross-referencing one or more captured images from the received data with one or more of global positioning system (GPS) coordinates and known flight formations;

detecting flight groups or determining geographic relationships between the one or more enemy aircraft based on the one or more cross-referenced images;

receiving one or more queries from the one or more affiliated pilots; and generating responses for the one or more queries based on real-time combat data, wherein a second module is configured to cross-reference the captured images with GPS coordinates and known flight formations, and to detect flight groups and to determine geographic relationships between one or more enemy aircraft, wherein the second module is further configured to:

detect groups of aircraft, wherein each group consists of aircraft positioned within a predefined number of nautical miles of one another; and test each group of aircraft for specific formation criteria.

10. The computer program product of claim 9, wherein a first module is configured to provide the one or more communication channels for submitting queries, receiving responses, and obtaining updates for situational awareness.

11. The computer program product of claim 10, wherein all queries, responses, and updates are transmitted orally over an audio channel.

12. The computer-implemented method of claim 10, wherein the first module includes a speech-to-text (STT) service configured to capture spoken commands from any of the one or more affiliated pilots and to convert the spoken commands into text-based inputs for the automated ABM, the first module also includes a text-to-speech (TTS) service configured to read aloud responses generated by the automated ABM for any of the one or more affiliated pilots.

13. The computer program product of claim 4, wherein the first module is configured to run an output of the TTS service through the STT service to recreate the initial text as a part of an error-checking protocol.

14. The computer program product of claim 10, wherein the first module employs a context-free grammar (CFG) system to define a set of unique commands.

15. The computer program product of claim 14, wherein the first module is configured to increase the delivery speed of the orally transmitted responses, or updates generated by the automated ABM based on the phase of the engagement, such that in the early phase of the engagement commands are calmly stated and use complete sentences and in later phases, commands are succinctly stated and use abbreviations and contractions within the CFG system.

16. The computer program product of claim 9, wherein a third module is configured to derive responses and to issue commands based on real-time combat data.

\* \* \* \* \*